United States Patent
Solomon et al.

(10) Patent No.: US 6,428,266 B1
(45) Date of Patent: *Aug. 6, 2002

(54) DIRECT DRIVEN ROBOT

(75) Inventors: Todd R. Solomon, Los Gatos; Donald J. Thomas; Gerard J. Labonville, both of San Jose, all of CA (US)

(73) Assignee: Brooks Automation, Inc., Chelmsford, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/677,402

(22) Filed: Jul. 9, 1996

Related U.S. Application Data

(63) Continuation-in-part of application No. 08/546,728, filed on Oct. 23, 1995, now Pat. No. 5,794,487, which is a continuation of application No. 08/500,428, filed on Jul. 10, 1995, now abandoned.

(51) Int. Cl.$^7$ ............................ B66C 23/00; B25J 17/00
(52) U.S. Cl. .................... 414/744.4; 901/28; 414/744.1
(58) Field of Search ..................... 414/744.1, 744.4, 414/936, 225, 225.01, 744.5; 901/19, 28, 29, 21

(56) References Cited

U.S. PATENT DOCUMENTS

| | | | |
|---|---|---|---|
| 3,247,978 A | * 4/1966 | Neumeier | 901/28 |
| 4,223,313 A | * 9/1980 | Chabrol | 901/28 |
| 4,499,341 A | 2/1985 | Boyd | 191/12.4 |
| 4,605,233 A | 8/1986 | Sato | 277/80 |
| 4,702,668 A | * 10/1987 | Carlisle et al. | 414/744.5 |
| 4,728,252 A | 3/1988 | Lada et al. | 414/744 |
| 4,813,846 A | * 3/1989 | Helms | 414/744.1 |
| 4,881,863 A | * 11/1989 | Braginsky | 414/225 |
| 4,897,015 A | 1/1990 | Abbe et al. | 414/744.8 |
| 4,923,352 A | * 5/1990 | Tamura et al. | 414/225 |
| 4,972,731 A | * 11/1990 | Akutagawa et al. | 901/28 |
| 5,007,784 A | * 4/1991 | Genov et al. | 414/225 |
| 5,046,992 A | * 9/1991 | Tamai et al. | 901/19 |
| RE34,311 E | * 7/1993 | Millis et al. | 414/217 |
| 5,451,135 A | 9/1995 | Schempf et al. | 414/674 |
| 5,513,946 A | 5/1996 | Sawada et al. | 414/744.5 |

* cited by examiner

Primary Examiner—Richard Chilcot
Assistant Examiner—Andrew Joseph Rudy
(74) Attorney, Agent, or Firm—Perman & Green, LLP

(57) ABSTRACT

A robot with a base, a first link connected to the base by a shoulder joint, and a second link connected to the first link by an elbow joint. A shoulder motor drives the shoulder joint, and an elbow motor drives the elbow joint. An upper elbow pulley is coupled to the first link. An end effector pulley coupled to the upper elbow pulley, and a dual-bladed end effector driven by the end effector pulley. The diameter of the upper elbow pulley and the diameter of the end effector pulley are related by a 1:2 ratio. Ferro-fluid seals are used to seal each joint. A static seal joins the seams of the links. Each arm link has a particle filter. The robot can communicate electrical signals through the revolute joints with a conductive slip-ring assembly. Alternately, the joint may have an inner cylinder and an outer cylinder, and a cable may be coiled between the cylinders.

10 Claims, 7 Drawing Sheets

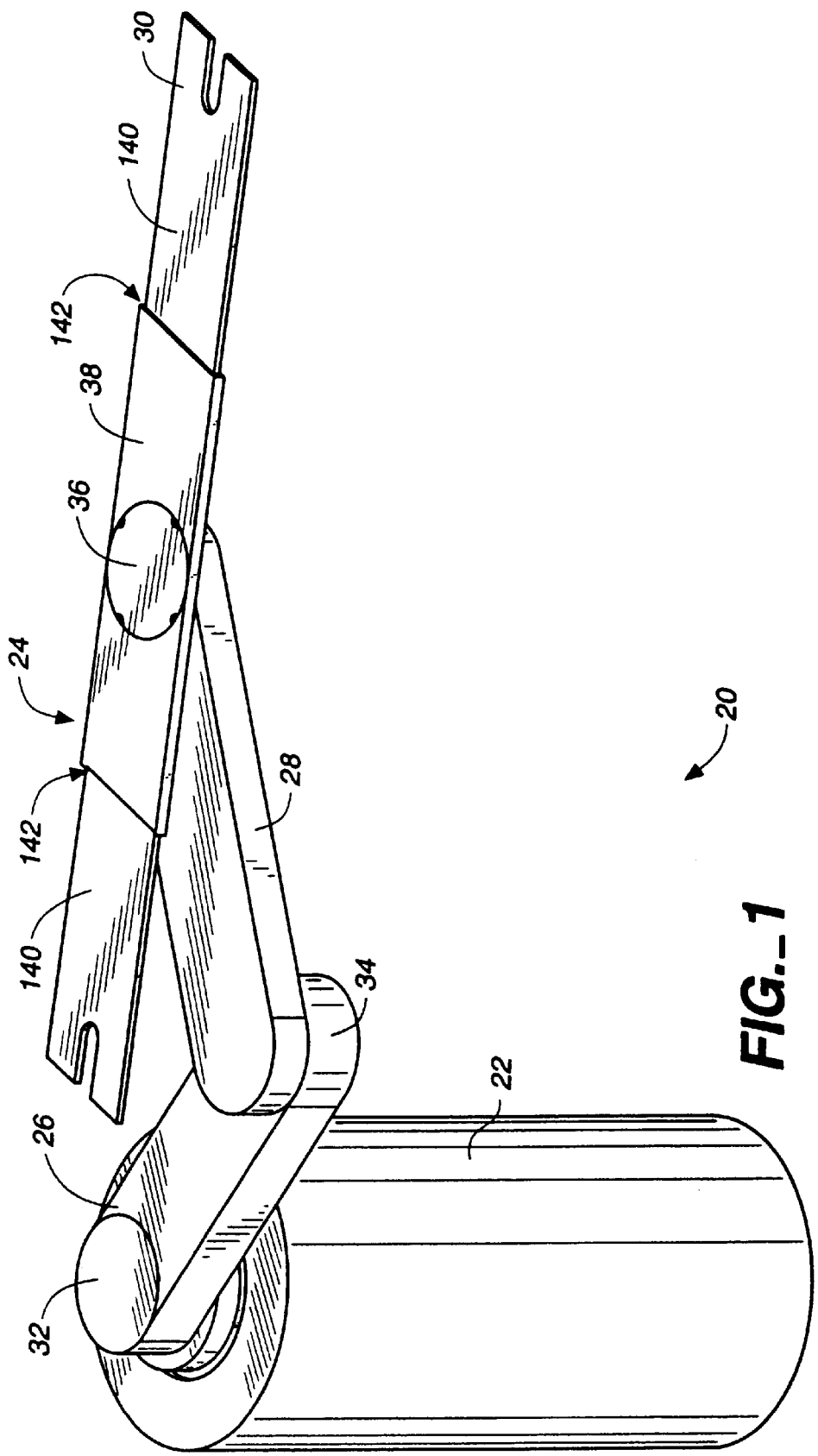
FIG._1

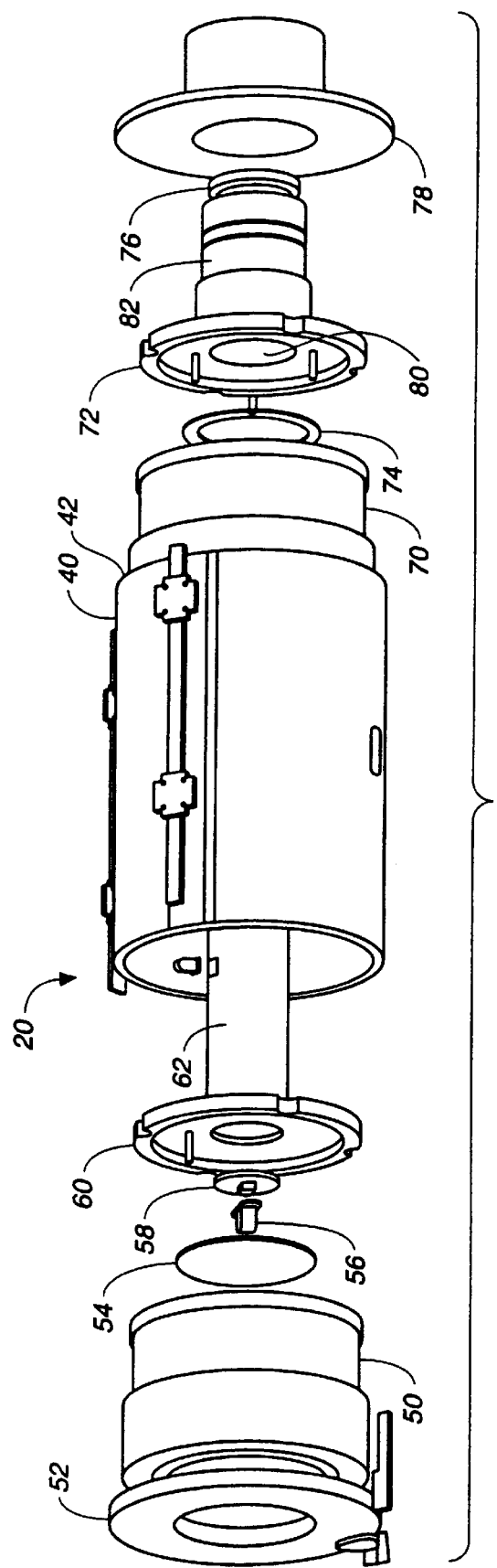
FIG._2

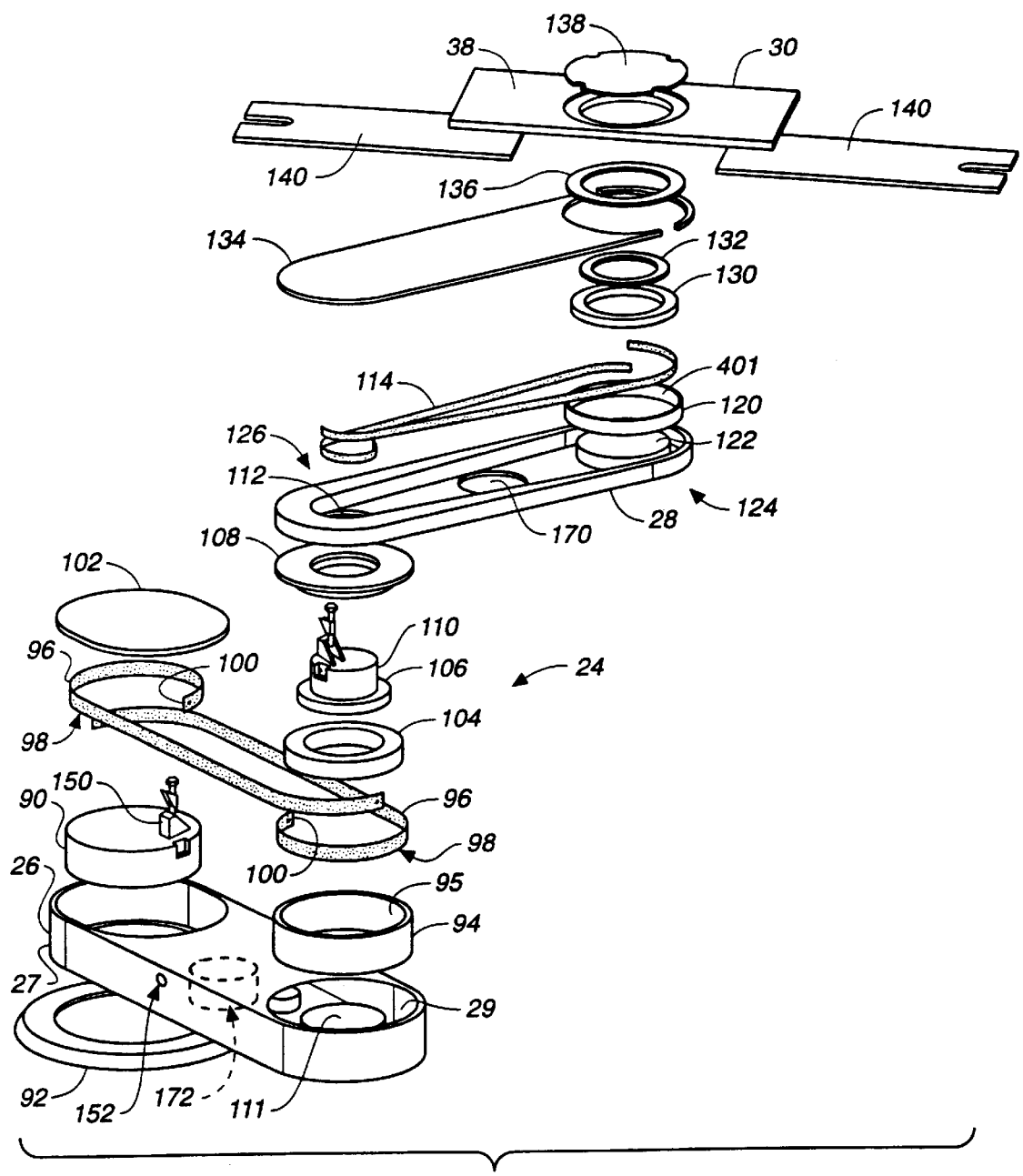
FIG._3

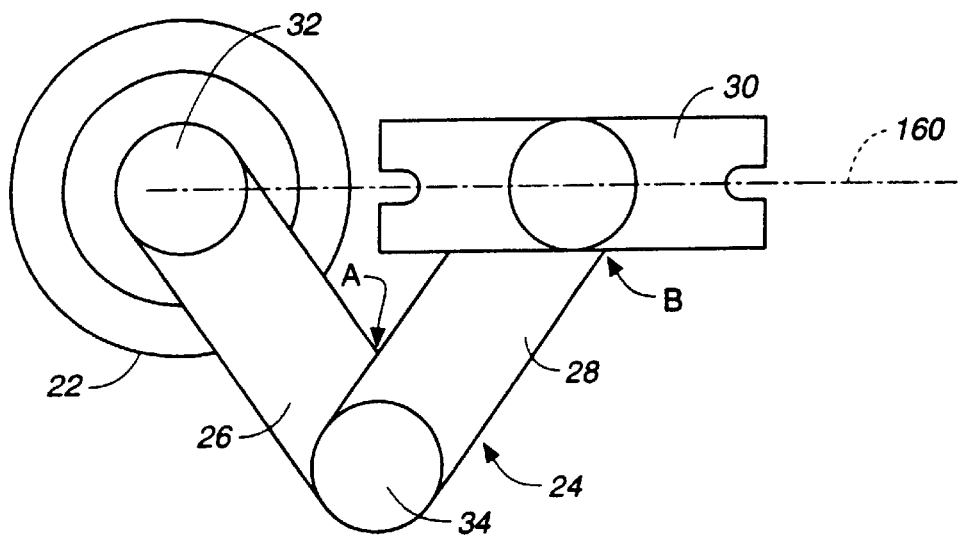
FIG._4
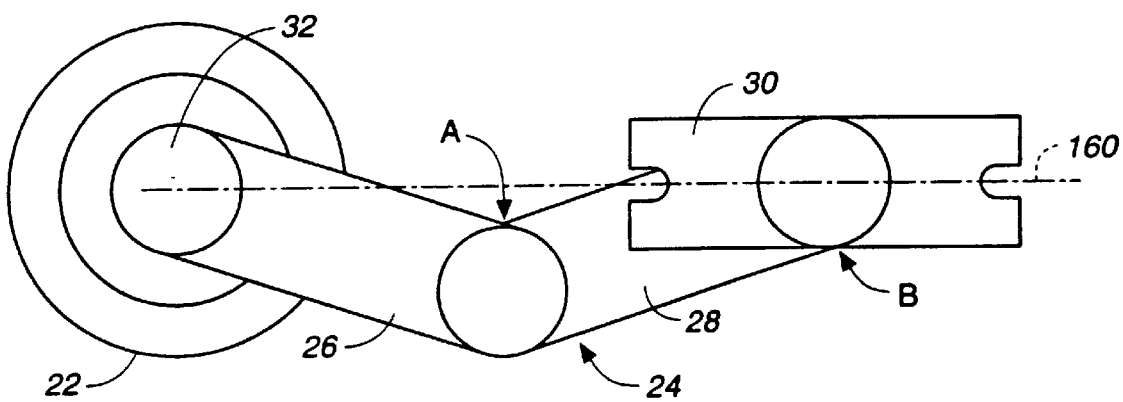
FIG._5

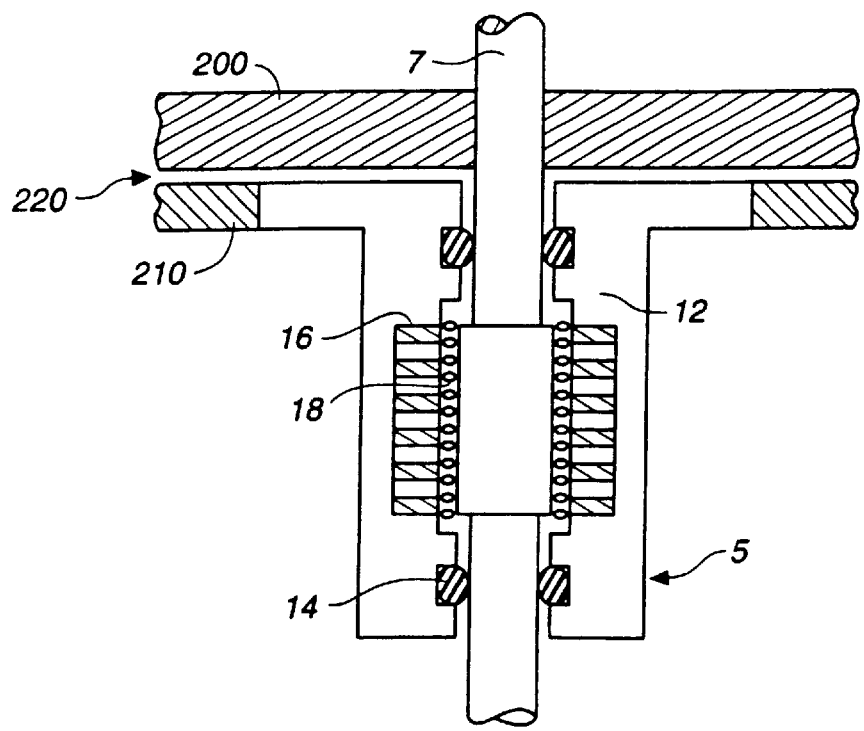
FIG._6
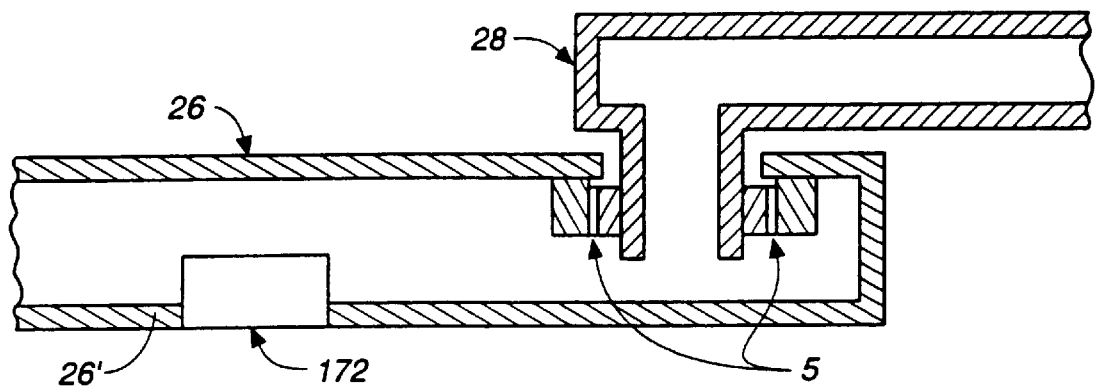
FIG._7

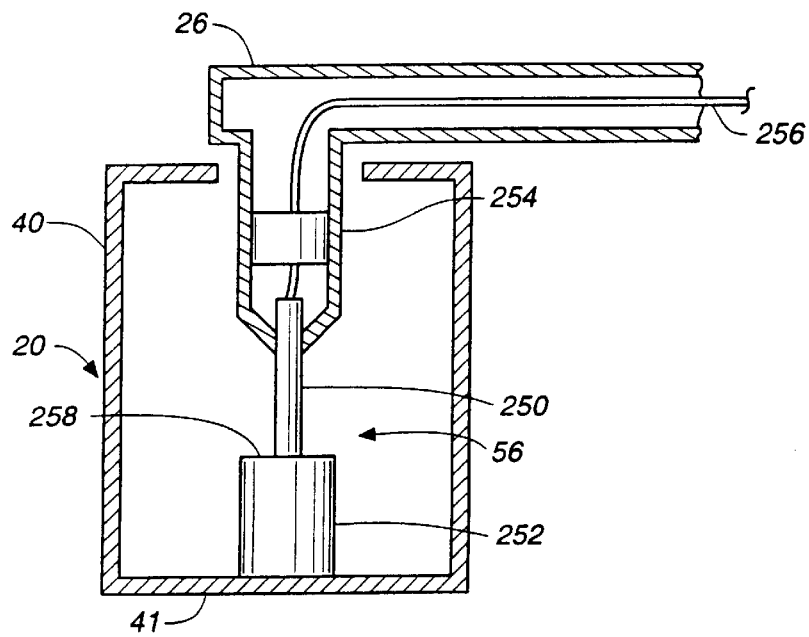
FIG._8
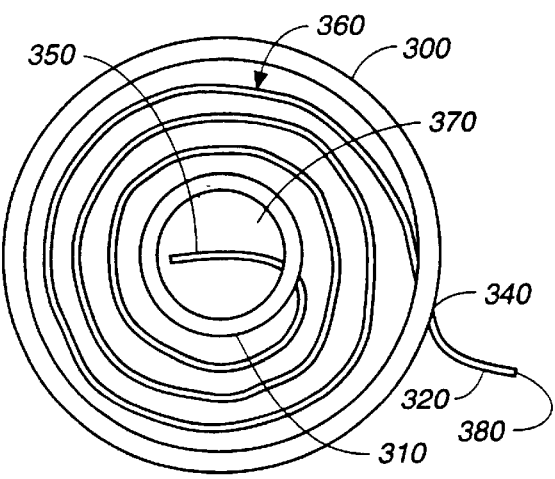
FIG._9
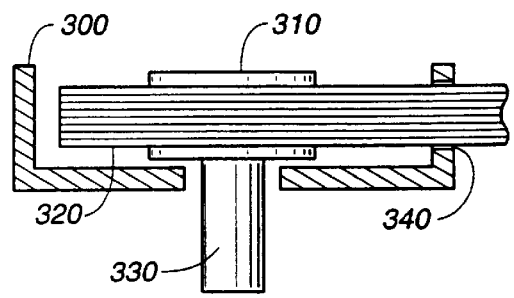
FIG._10

DIRECT DRIVEN ROBOT

CROSS-REFERENCE TO RELATED APPLICATIONS

This application is a continuation-in-part of U.S. application Ser. No. 08/546,728, filed Oct. 23, 1995, now U.S. Pat. No. 5,794,487 which is a continuation of U.S. application Ser. No. 08/500,428, now abandoned filed Jul. 10, 1995, both of which are assigned to the assignee of the present invention.

Reference is also made to U.S. application No. 08/500,124, filed Jul. 10, 1995, now U.S. Pat. No. 5,676,472 and U.S. application Ser. No. 08/500,429, filed Jul. 10, 1995, now U.S. Pat. No. 5,692,795 and to concurrently filed U.S. application entitled ROBOTIC ARM HAVING A SPLASH GUARD, now U.S. Pat. No. 5,775,169 and concurrently filed U.S. application entitled ROBOTIC JOINT USING METALLIC BANDS, now U.S. Pat. No. 5,778,730, all assigned to the assignee of the present application, and each of which is hereby incorporated by reference.

BACKGROUND OF THE INVENTION

This invention generally relates to material handling robots, and specifically relates to directly driving arm links and end effectors of a robot.

Material handling robots are used in automated manufacturing of integrated circuits, flat panel displays, and other precision-made products. Many of these products require near-sterile handling of extremely fragile and expensive materials, such as semiconductor wafers, during the manufacturing process. In semiconductor manufacturing, raw materials and in-process workpieces must be kept extremely clean; the circuit paths etched on the workpieces are so small (e.g., 0.18–10 microns) that minute particles can contaminate the paths and render the finished circuit inoperative. Therefore, sealed, ultra-clean robots are used to move the materials accurately, gently, and precisely, within a clean room, preventing contamination or damage to the materials which could occur through human contact or handling. However, such robots must not generate particles of metal, leak chemicals, or produce other materials which could contaminate a wafer or other substrate.

Further, robots must move precisely to specific points in space to carry out various manufacturing steps. Because wafers, flat panels, and other substrates are extremely fragile and expensive, all robot movements must be gentle and precise. "Backlash," or play in the mechanical components of the robot, must be minimized to ensure accurate movement and to prevent damage to an object on the robot.

In addition, some manufacturing processes are carried out in a vacuum, or require hazardous chemicals. Robots must be vacuum-compatible, and able to handle materials in vacuum and corrosive environments which are hostile to humans.

Accordingly, there is an acute need in this field for an ultra-clean material handling robot which is reliable, operates with minimum or zero backlash, fully sealed against particle generation, and vacuum-compatible.

SUMMARY OF THE INVENTION

In general, in one aspect, the invention is directed to a robot. The robot has a base, a first link connected to the base by a shoulder joint, and a second link connected to the first link by an elbow joint. A shoulder motor drives the shoulder joint, and an elbow motor drives the elbow joint. An upper elbow pulley is coupled to the first link. An end effector pulley coupled to the upper elbow pulley, and a dual-bladed end effector driven by the end effector pulley. The diameter of the upper elbow pulley and the diameter of the end effector pulley are related by a 1:2 ratio.

Features of this aspect include: a first elbow drive pulley driven by the elbow motor; a second elbow drive pulley coupled to the first elbow drive pulley and driven thereby; wherein the first and second elbow drive pulleys have equal diameters; and wherein the second elbow pulley is coupled to the second link; a shoulder motor drives an arm link, wherein the elbow drive pulleys are mounted in the arm link; the elbow drive motor and shoulder motor are concentrically mounted in a housing; a slip-ring assembly for communicating signals from within the housing to the arm link; the slip-ring assembly comprises a static member affixed to the housing and a moving member affixed to the arm link, whereby the arm link may rotate about the housing; each joint is sealed by a fluid seal; and each fluid seal is a ferro-fluid seal.

In another aspect, the invention is directed to a robot with a shoulder motor, a first arm link coupled to the shoulder motor by a shoulder joint, and a second arm link coupled to the first arm link by an elbow joint. The shoulder joint is sealed by a first fluid seal and the elbow joint is sealed by a second fluid seal.

Features of this aspect include an end effector coupled to the second arm link by a wrist joint; the wrist joint is sealed by a third fluid seal; the first and second fluid seals comprise ferro-fluid seals; the arm links comprise seams, and further comprising a static seal joining each seal; a particle filter in a wall of each arm link; and the third fluid seal comprises a ferro-fluid seal.

In another aspect, the invention comprises a robot arm link having a particle filter in a wall of the arm link. Features of this aspect is that the filter is a high-density particle filter; and the arm link further comprises a closed wall joined in a seam, and a static seal in the seam, and the arm link is vacuum compatible.

In another aspect, the invention provides apparatus for communicating an electrical signal through a revolute robot joint, comprising a conductive slip-ring assembly having a static member affixed to a static link of the joint, and having a moving member affixed to a moving link of the joint. Features of this aspect include a first signal cable coupled to the static member and a second signal cable coupled to the moving member, wherein the static member and the moving member are rotatably and conductively coupled.

In another aspect, the invention provides apparatus for communicating an electrical signal through a revolute robot joint, the joint comprising an outer cylinder and an inner cylinder concentrically mounted in the outer cylinder, the apparatus comprising a cable having an inner end in the inner cylinder, a cable body coiled around the inner cylinder within the outer cylinder, and an outer end extending through the outer cylinder.

BRIEF DESCRIPTION OF THE DRAWING

FIG. 1 is a perspective view of a robot.

FIG. 2 is an exploded side perspective view of a robot base.

FIG. 3 is an exploded side perspective view of a robot arm.

FIG. 4 is a top plan view of a robot arm in a partly extended position.

FIG. 5 is a top plan view of a robot arm in a nearly fully extended position.

FIG. 6 is a side section view of a fluid seal joining a revolute robot joint.

FIG. 7 is a side section view of a robot arm link with a filter.

FIG. 8 is a side schematic view of a way to pass signals through a revolute robot joint.

FIG. 9 is a top schematic view of another way to pass signals through a revolute robot joint.

FIG. 10 is a partly sectional side view of the way to pass signals shown in FIG. 9.

DETAILED DESCRIPTION

Figure 11:
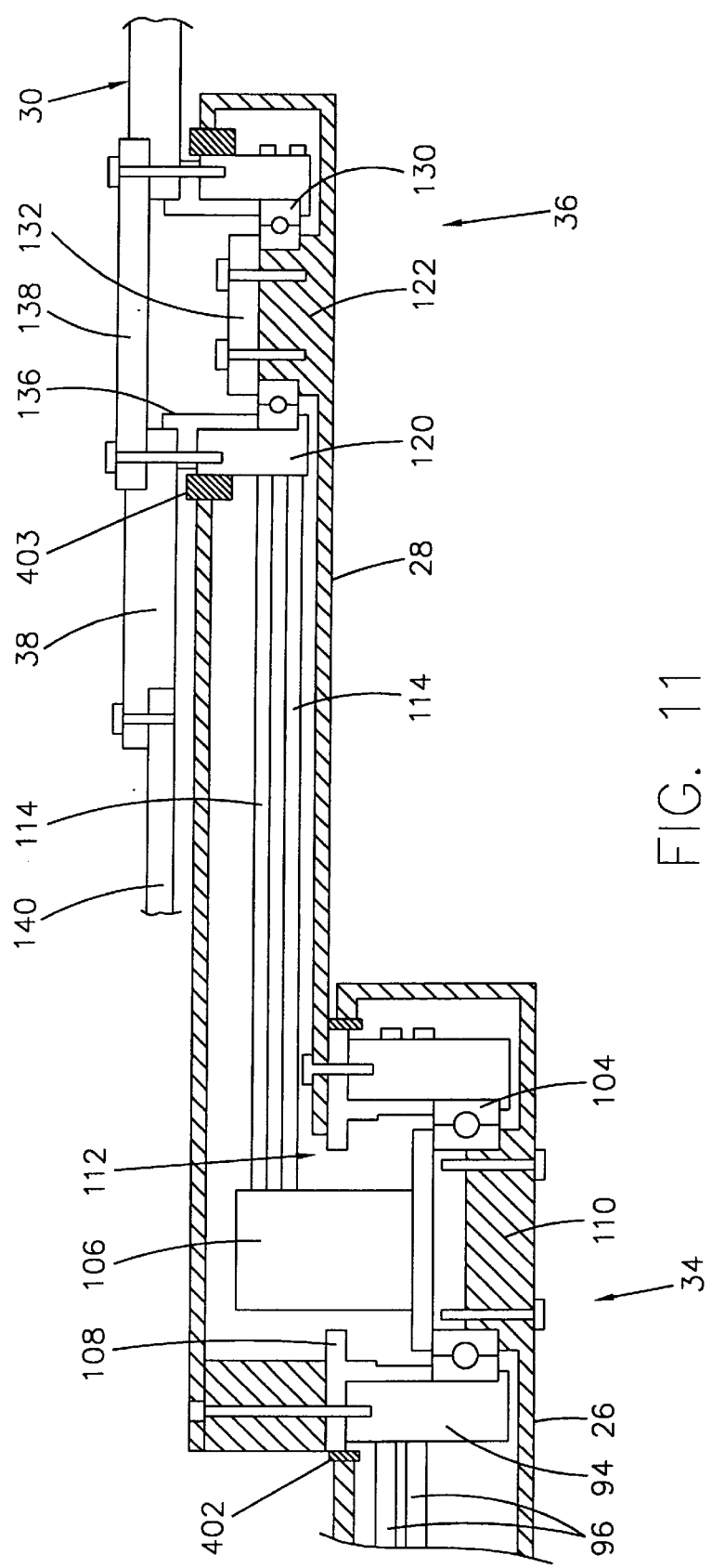
FIG. 11 is a side sectional view of a robot arm in a fully extended position.

In the drawings of this disclosure, like reference numerals in different drawings refer to identical structures.

As shown in FIG. 1, a robot 20 is constructed to mimic the structure and lateral freedom of motion of a human arm. Robot 20 has a base 22 with an attached movable arm 24. The arm 24 includes a lower arm link 26, an upper arm link 28, and a hand or end effector 30. The lower arm link 26 is connected to the base 22 at a rotatable shoulder 32; the upper arm link 28 is connected to the lower arm link 26 by a rotatable elbow 34; and the end effector 30 is connected to the forearm 28 by a rotatable wrist 36.

The base 22 contains motors to drive several rotatable shafts. One rotatable shaft connects to the lower arm link 26 and controls the rotation of the shoulder 32. Another shaft connects to the upper arm link 28 by a pulley and controls the rotation of the elbow 34. Within the elbow 34 is a pulley which controls the rotation of the end effector 30. In this arrangement, under control of an external controller such as a microcomputer, the motors operate the arm 24 so that the shoulder joint 32 rotates, or the end effector 30 moves radially inward or outward relative to the shoulder joint 32 and center axis of the robot. In this particular field, only radial movement of the end effector is required; the end effector is always aligned to move along a radius extending from the center of the robot base to an external work station or other location.

The end effector 30 comprises a center plate 38 which is rotatable around the wrist 36. Extending radially outwardly from the wrist 36 is a pair of end effector blades 140. The near end 142 of each blade is joined to the center plate 38. Each of the blades 140 can lift and transport an object such as a semiconductor wafer, flat panel display, substrate, or other object. Thus, the end effector 30 is the type known in the art as a "double ended" end effector.

As shown in FIG. 2, the robot base 22 has a cylindrical motor housing 40 which encloses and protects an elbow motor 50 and a shoulder motor 70. The elbow motor 50 is seated on a bottom plate 52 which is attached to the base of the robot. An elbow drive shaft 62 is coupled to the elbow motor 50. A homing flag 54 provides a way to sense when the motor and shaft have reached a home position. A slip-ring assembly 56 is affixed to a slip-ring mount 58 and a shaft assembly 60, enabling control signals to pass through the assembly. When the apparatus is assembled, the elbow drive shaft 62 protrudes upwardly through the housing 40 and connects to a first elbow drive pulley 90 shown in FIG. 3.

The shoulder motor 70 is mounted in the housing 40 directly above the elbow motor 50, and has a large center hole through which shaft 62 passes. A shoulder drive shaft 82 is coupled to the shoulder motor 70 with a homing flag 74 and a shaft assembly 72; the shaft assembly 72 and the shoulder shaft 82 have a large hole 80 extending through them to provide clearance for the elbow shaft 62. A shoulder drive ball bearing 76 slips between shafts 60 and 82 to provide support for the shaft 62. An inner magnetic fluid dynamic rotary seal 404 also slips between shafts 60 and 82. Thus, the shoulder motor 70 directly drives the lower arm link 26 to rotate about the center of the robot 20.

A feedthrough 78 is affixed to the top rim 42 of the housing 40 to provide a sealing surface for a bellows and for the outer magnetic fluid dynamic rotary seal 405. The outer seal 405, along with the inner seal 404, provide a vacuum pressure differential barrier and a particle barrier for the shoulder joint. The assembled housing 40 is driven upward and downward, in the Z-axis direction, by a Z-axis motor and ballscrew, and is enclosed in a sealed outer housing which prevents entry or exit of particles or contaminants.

FIG. 3 shows a direct-driven robot arm 24 in exploded form. When the arm 24 is assembled to the robot base shown in FIG. 2, splash guard 92 is seated on shoulder shaft 82. The first elbow drive pulley 90 is seated on elbow drive shaft 62. The first elbow drive pulley 90 is linked to a second elbow drive pulley 94 by drive tapes 96. The second elbow drive pulley 94 is generally cylindrical with a central circular cavity 95, and rides in an elbow well 29 in the lower arm link 26. A ball bearing 104 is placed into elbow well 29 inside the second elbow drive pulley 94. The outer rotating race of the ball bearing 104 is captured between the second elbow drive pulley 94 and a bearing clamp 108. The inner rotating race of the ball bearing 104 is captured between an upper elbow pulley 106 and a circular boss 110 of the elbow end of the lower arm link 26.

The diameter of the first and second elbow drive pulleys are substantially identical, i.e., the diameters are related by a 1:1 ratio. The drive tapes 96 comprise metal bands, or laminated metal-visco-elastic bands, each having one end 98 wrapped around one of the pulleys 92, 94 and retained in place by a pin 100. A band tensioner 150 enables adjustment of tension in the bands. The amount of band tension can be measured by inserting a measuring tool through hole 152. The other end of each band is pinned to the opposite pulley. The first end 98 of each band wraps around about 320 degrees of the circumference of a pulley 92, 94.

The upper arm link 28 is attached to the bearing clamp 108, and thus rotates with the second elbow drive pulley 94. In this arrangement, circular motion of the first elbow drive pulley 90 exerts direct force on the drive tapes 96, thereby rotating second elbow drive pulley 94 and upper arm link 28.

A shoulder cover 102 encloses and protects the first elbow drive pulley 90 and the shoulder joint, preventing incursion of contaminants or release of particles from the joint.

Referring to FIG. 11, the upper elbow pulley 106 extends through the bearing clamp 108 and through a corresponding hole 112 in the elbow end 126 of the upper arm link 28. A pair of end effector drive tapes 114 are attached to the upper elbow pulley 106 and retained in place by pins on the shaft in the manner described above in connection with drive tapes 96.

An end effector drive pulley 120 is located in the wrist end of the upper arm link 28. The end effector drive pulley 120 is generally cylindrical with a cylindrical circular cavity 401 (see FIG. 3). The end effector pulley 120 is coupled to the upper elbow pulley 106 by drive tapes 114. The diameter of the upper elbow pulley 106 is one-half the diameter of the end effector pulley 120, i.e., the diameters of pulleys 106, 120 have a 1:2 ratio.

A ball bearing 130 is positioned in the cavity 401 of end effector drive pulley 120. The outer race of ball bearing 130 is captured between the end effector drive pulley 120 and an outer bearing clamp 136. The inner rotating race of the ball bearing 130 is captured between an inner bearing clamp 132 and a circular boss 122 of the wrist end of the upper arm link 28.

An upper arm link cover 134 extends across the arm link 28 to cover the pulleys and drive tapes therein, sealing them against particle leakage and protecting them from incursion of contaminants. A clamp plate 138 is affixed to the end effector 30 and retains the end effector 30 on the pulley.

Optionally, a magnetic fluid rotary seal 402 may be installed between the lower arm link 26 and the second elbow pulley 94. This will seal the elbow joint 34 against particles or contaminants from entering or escaping the joint. Similarly, an optional magnetic fluid dynamic rotary seal 403 can be installed between the upper arm link 28 and end effector drive pulley 120 to seal the wrist joint 36.

The length of the lower arm link 26 is equal to the length of the upper arm link 28, where "length" refers to the distance between the joints at either end of each arm link. In this arrangement, the shoulder motor 82 is directly coupled to the shoulder joint. The elbow motor 50 is attached to a pulley 90 in the shoulder joint, which pulley is driven at a one-to-one ratio with another pulley 94 in the elbow joint. Therefore, if the shoulder motor is static, one revolution of the elbow motor yields one revolution of the elbow joint.

In addition, the end effector drive pulley 120 in the upper arm link drives the end effector in rotational motion relative to the upper arm link. The end effector drive pulley 120 is twice the diameter of an upper elbow drive pulley 106. In this arrangement, when the shoulder motor and the elbow motor are driven at the same rate but in opposite directions, the end effector is radially extended, i.e., driven in a straight line extending radially so that a center axis of the end effector always crosses the shoulder axis. If the shoulder motor and the elbow motor are driven at the same rate in the same direction, the upper link 28 will be fixed relative to the lower arm link 26, and the whole arm 24 will rotate about the shoulder joint.

FIG. 4 and 5 show how the linear radial extension works. In FIG. 4, the robot arm 24 is shown in a partly retracted state while in FIG. 5 the arm 24 is shown fully extended. When the shoulder motor and the elbow motor are driven at the same rate but in opposite directions, several concurrent motions occur. The shoulder joint 22 rotates, so that lower arm link 26 moves counterclockwise into the position shown in FIG. 5. Concurrently, the elbow joint 34 rotates at the same rate but in the reverse direction, i.e., clockwise, so that upper arm link 28 rotates clockwise with respect to lower arm link 26. Also, the end effector rotates counterclockwise with respect to upper arm link 28, but at half the rate of the other links. In this manner, the end effector moves outward along radius line 150, so that the end effector always stays aligned with the line 150. This linear movement is achieved by recognizing that in moving between the positions shown in FIG. 4 and 5, the angle A subtended by links 26 and 28 becomes more acute at twice the rate as the angle B subtended by the link 28 and the end effector 30. This 2:1 ratio of angular change is accomplished by using the 2:1 ratio of the end effector drive pulley 120 to the upper elbow pulley 106.

This apparatus provides a direct drive mechanism which avoids backlash generated by prior mechanisms which use timing belt and/or gear reductions inside the arm links and/or inside the robot. By using large direct-drive motors, no gearing is required in the base and the drive train is simple. The drive mechanism is highly reliable and rugged. Reliability can be increased by using brushless servo motors.

In this system each of the dynamic arm joints, including the shoulder, elbow, and wrist, are sealed by magnetic fluid dynamic rotary seals, also known as ferrofluid seals, or equivalent fluid rotation seals. FIG. 6 shows an exemplary sealed dynamic joint of an upper arm link 200 and a lower arm link 210. A rotating shaft 7 extends from a motor 406 in the lower arm link 210 which drives the upper link 200. To enable the upper link 200 to rotate over the lower link 210, a tiny gap 220 separates the two links. In a vacuum robot, the gap 220 is at vacuum whereas the interior of the links 200, 210 are at atmospheric pressure. Therefore, the joint between shaft 7 and the walls of lower link 210 must be sealed by a rotary seal 5 to prevent atmosphere from exiting the link. In addition a seal is required to prevent particles from the motor 406 or link components from exiting into the ultra-clean vacuum environment.

Seal unit 5 includes a housing 12 which surrounds shaft 7, and ball bearing 14. The inside of the hollow arm links is completely sealed from the external vacuum environment, and can remain at approximate atmospheric pressure.

As shown in FIG. 6, in the magnetic fluid or "ferrofluid" dynamic rotary seal, a ring of magnetic liquid 18 fills the gap between the moving shaft 7 and the stationary housing 12. Magnetic liquid 18 is held in place by a powerful magnets 16, thereby sealing the gap while allowing rotation of shaft 7, protecting against incursion of corrosive materials, and preventing exit of particulate contaminants. The liquid also has a damping effect, through viscous drag, on any residual vibration caused by the motors and pulleys.

Static seals are used to prevent gas or particulate leakage from or to the interior of each hollow arm link 26, 28. For example, static O-ring seals can be used around the cover plate 102. Alternatively, flange seals such as CONFLAT flange seals available from Varian Corporation, Menlo Park, Calif. are used to seal seams in the sheet metal forming the arm links.

In the past, robots have used clean manufacturing practices and non-fluid seals in an attempt to contain particles within the robot and prevent incursion of contaminants. However, use of ferro-fluid seals at the dynamic arm joints offers significant advantages. Any particulates generated inside the robot links cannot escape into the clean environment. Any corrosive materials on the exterior of the robot cannot get into the robot's internal components. Also, when used in a vacuum, the internal components need not be vacuum-compatible because the fluid seals provide an atmospheric barrier. The arrangement described above implements dynamic seals in all revolute joints and static seals in all other locations of an arm link which have a seam or gap.

The robot described above is fully sealed, but an alternative embodiment uses vented arm links. As shown in FIG. 3 and 7, in each arm link 26, 28, a high-density metallic or ceramic filter 170, 172 is mounted in the bottom wall 26' of the arm link or arm "tub". The filters provide a dense barrier against entry or exit of particles from the arm links. In addition, the filters ensure that very little pressure differential exists between the arm links, enabling use of thin single-stage ferro-fluid exclusion seals 5 at dynamic joints between the links 26, 28. This offers significant advantages. For example, all arm joints can be made thinner, particularly the wrist joint. Also, all of the joint bearings are protected against direct chemical attack by the ferro-fluid seals. The filter reduces or eliminates contamination from particles inside the links.

As noted above, a slip-ring assembly 56 is coupled between the motor 50 and the shaft assembly 60. FIG. 8 shows a general way to use a slip-ring assembly to transfer electric signals from a rotating element, such as an arm link, to a static element, such as a robot base. FIG. 8 shows a robot 20 with a static base housing 40 and a movable arm link 26. A slip-ring assembly 56 is mounted within the base housing, on the center line of rotation of the link 26. A control cable 256 is routed inside the arm link 26, and it is desired to couple the signals in the cable to electronic components in the base housing. The cable 256 passes through a vacuum barrier 254 and is mechanically affixed and electrically coupled to a rotating member 250 of a slip-ring assembly 56. The static member 252 of the slip-ring assembly is mounted to the robot base 41. The slip-ring has concentric ring contacts on an upper face 258 of the static element 252, and corresponding wipers on the rotating member 250. When the rotating member turns, the wipers wipe across the ring contacts, providing an electrically conductive path which can rotate. Thus, the arm link 26 can be rotated without worrying about wire wind-up or excessive flexing, twisting, and coiling of wires in the base.

Other types of slip rings, such as mercury slip ring assemblies, can be used.

FIG. 9 and FIG. 10 show another way to feed an electric signal through a revolute robot joint. FIG. 9 and 10 show an outer static cylinder 300 such as an upper arm link mounted concentric with a rotating inner cylinder 310 such as a shaft or pulley which rotates within the static cylinder 300. The inner cylinder 310 is driven by a shaft 330 extending downwardly to a motor or other device. A ribbon cable 320 extends from outside the static cylinder 300 through a hole 340 in the static cylinder. Within the static cylinder 300, the cable 320 is loosely arranged in a coil 360 around the inner cylinder 310. The coil 360 has about three turns of cable. The far end 350 of the cable passes through a hole 370 in the inner cylinder 310. The far end 350 and the near end 380 of the cable 320 are coupled to circuitry or sensors.

The cable 320 may be a flex circuit or other suitable wiring harness which is durable against abrasion and vacuum compatible.

In this arrangement, the shaft 330 can freely rotate several revolutions without affecting signal flow through the cable 320. The cable 320 simply flexes slightly, without moving substantially, as the shaft rotates. The cable 320 is made sufficiently long to permit the shaft to rotate several times. Thus, this arrangement prolongs the life of a wiring harness or cable 320 by preventing the cable 320 from coiling too tightly. The ability to rotate through an arc of 360 degrees or greater is a significant advantage over robots which are limited to rotation of 320 degrees or less. Full-rotation robots often can take a shorter path to a particular workstation.

This arrangement can be used in any revolute joint of a robot, including the shoulder, elbow, and wrist.

Other alternative embodiments are within the scope of the claimed invention.

What is claimed is:

1. A robot comprising:

a stationary base;

a rotatable first link connected to the base by a shoulder joint;

a rotatable second link connected to the first link by an elbow joint;

a shoulder motor located inside the base to drive the shoulder joint;

a shoulder drive shaft extending from the shoulder motor and non-rotatably secured to the first link;

an elbow motor located inside the base to drive the elbow joint;

a first elbow pulley positioned in the shoulder joint;

an elbow drive shaft extending from the elbow motor and secured to the first elbow pulley;

a second elbow pulley positioned in the elbow joint, the second elbow pulley coupled to the first elbow pulley by a first metal drive belt and driven thereby, the second elbow pulley secured to the second link, the first metal drive belt having a first end pinned to the first elbow pulley and a second end pinned to the second elbow pulley;

an upper elbow pulley positioned in the elbow joint and coupled to the first link;

an end effector pulley coupled to the upper elbow pulley by a second metal drive belt, the second metal drive having a first end pinned to the end effector pulley and a second end pinned to the upper elbow pulley, a diameter of the upper elbow pulley and a diameter of the end effector pulley being related by a 1:2 ratio; and a dual-bladed end effector driven by the end effector pulley.

2. The robot of claim 1, wherein the first and second elbow pulleys have equal diameters.

3. The robot of claim 1, wherein the first metal drive belt extends from the first elbow pulley to the second elbow pulley along a substantially straight first path.

4. The robot of claim 3, wherein the second metal drive belt extends from the upper elbow pulley to the end effector pulley along a substantially straight second path.

5. The robot of claim 1, further comprising a slip-ring assembly for communicating signals from within the base to the first link.

6. The robot of claim 5, wherein the slip-ring assembly comprises a static member affixed to the base and a moving member affixed to the first link, whereby the first link may rotate about the base.

7. The robot of claim 1, wherein each joint is sealed by a fluid seal.

8. The robot of claim 7, wherein each fluid seal is a ferro-fluid seal.

9. The robot of claim 1, wherein the elbow motor and shoulder motor are concentrically mounted in the base.

10. A robot comprising:

a stationary base;

a rotatable first link connected to the base by a shoulder joint;

a rotatable second link connected to the first link by an elbow joint;

a shoulder motor located inside the base to drive the shoulder joint;

a shoulder drive shaft extending from the shoulder motor and non-rotatably secured to the first link;

an elbow motor located inside the base to drive the elbow joint;

a first elbow pulley positioned in the shoulder joint;

an elbow drive shaft extending from the elbow motor and secured to the first elbow pulley;

a second elbow pulley positioned in the elbow joint, the second elbow pulley coupled to the first elbow pulley by a first drive belt and driven thereby, the second elbow pulley secured to the second link, the first drive belt extending from the first elbow pulley to the second elbow pulley in a substantially straight first path;

an upper elbow pulley positioned in the elbow joint and coupled to the first link;

an end effector pulley coupled to the upper elbow pulley by a second drive belt, the second drive extending from the end effector pulley to the upper elbow pulley along a substantially straight second path, a diameter of the upper elbow pulley and a diameter of the end effector pulley being related by a 1:2 ratio; and a dual-bladed end effector driven by the end effector pulley.

* * * * *